Sept. 20, 1955   J. H. O'NEIL   2,718,313
CAN ARRANGING METHOD AND APPARATUS
Filed Sept. 19, 1949   5 Sheets-Sheet 1
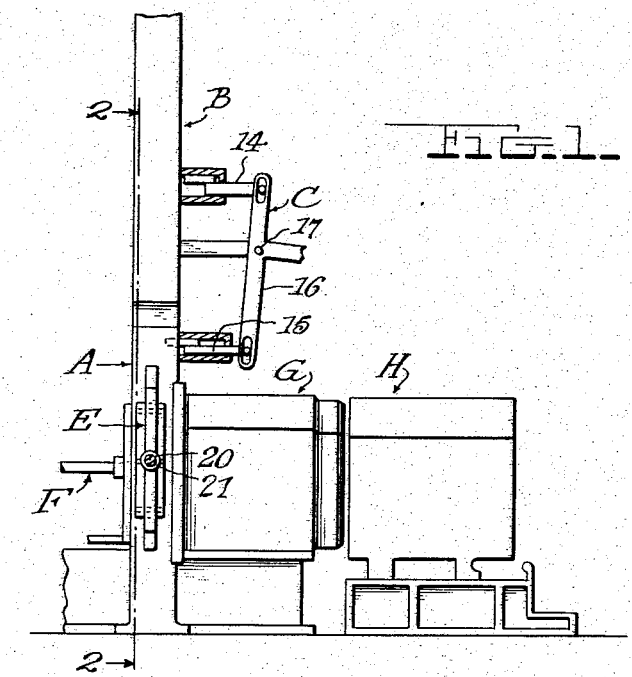
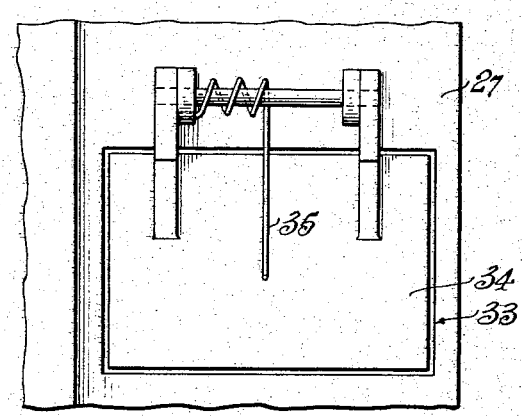
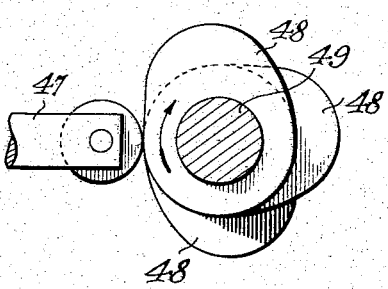
INVENTOR.
James H. O'Neil,
BY
Mason, Porter, Diller & Stewart
attys.

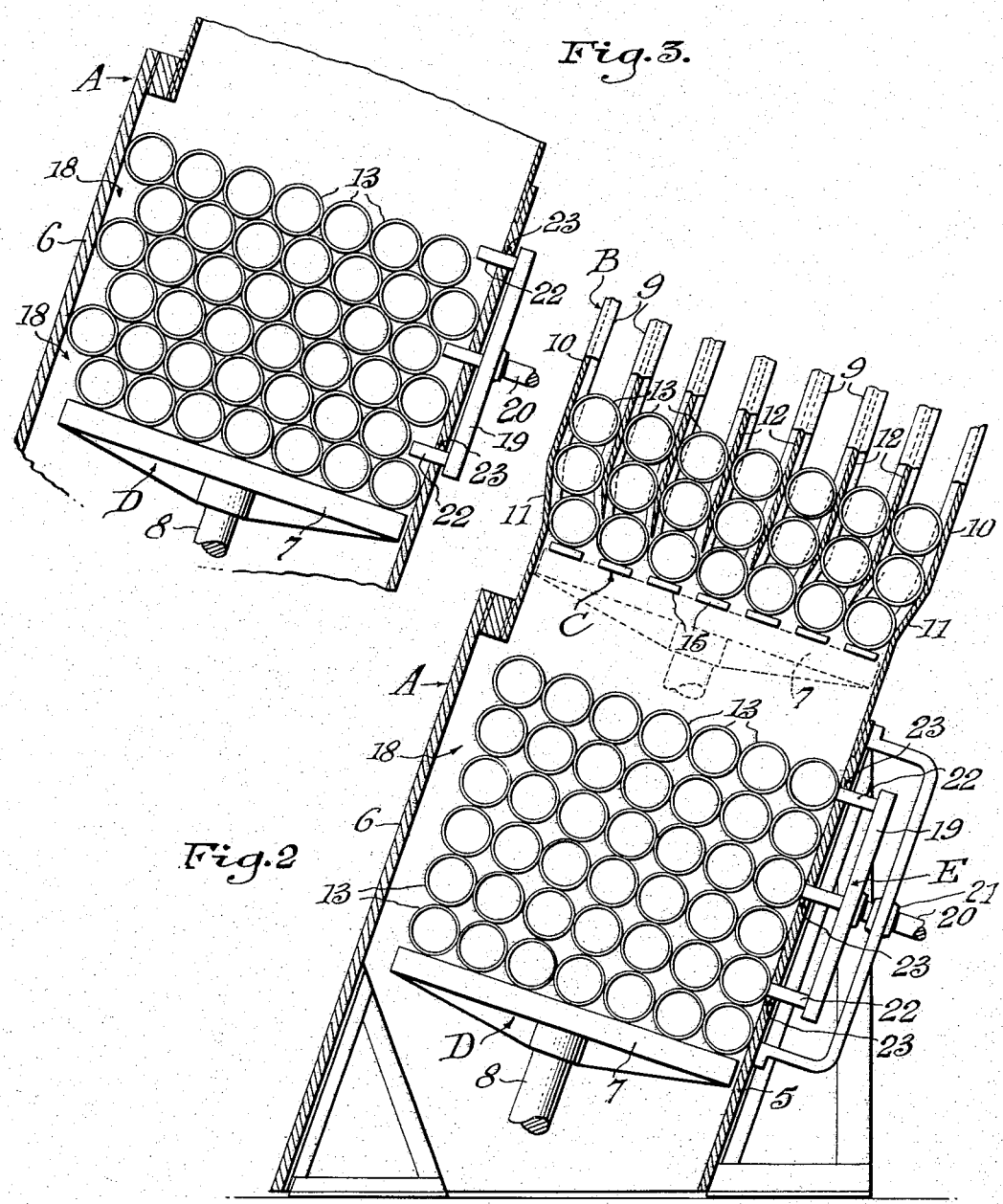

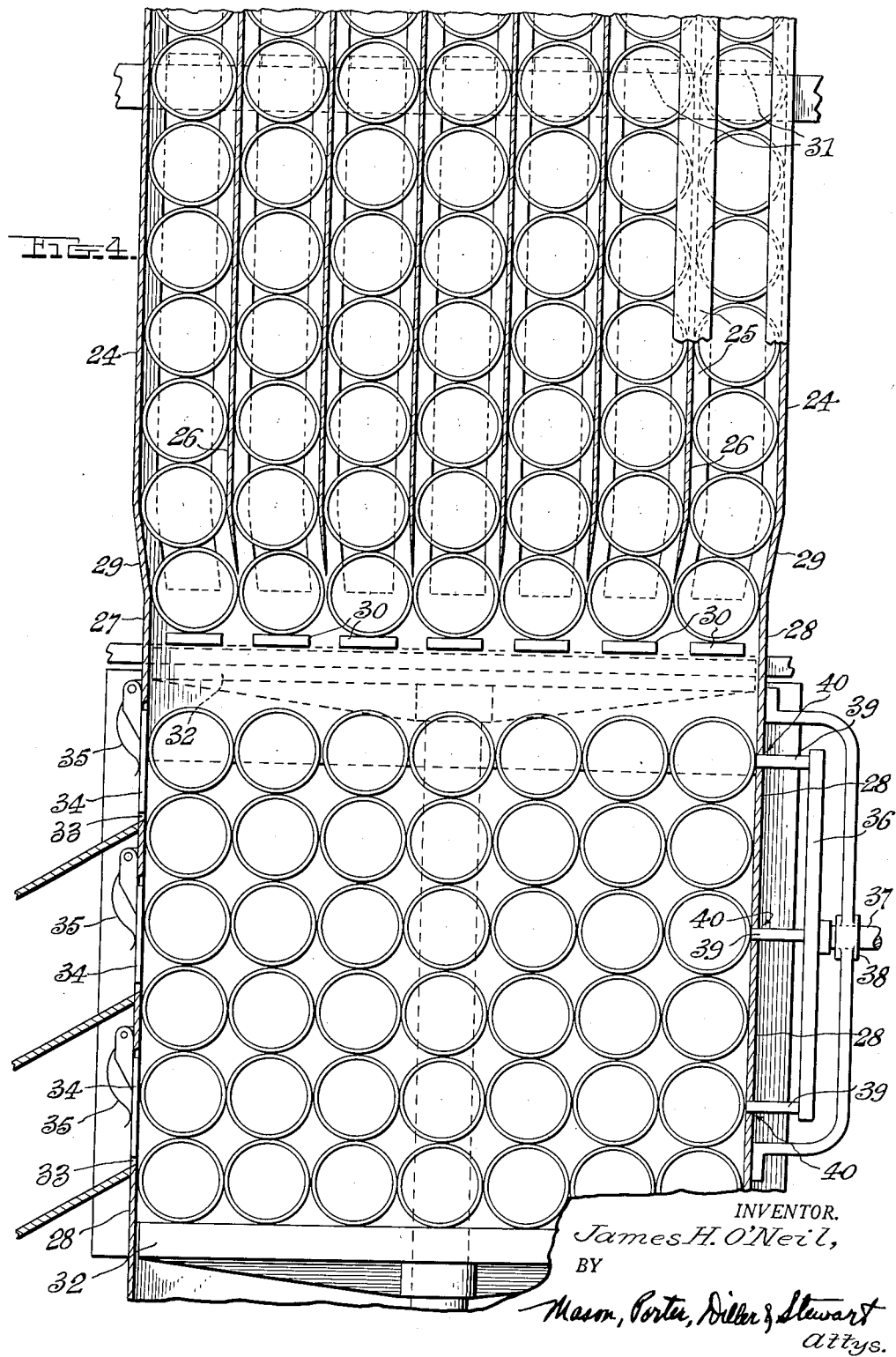

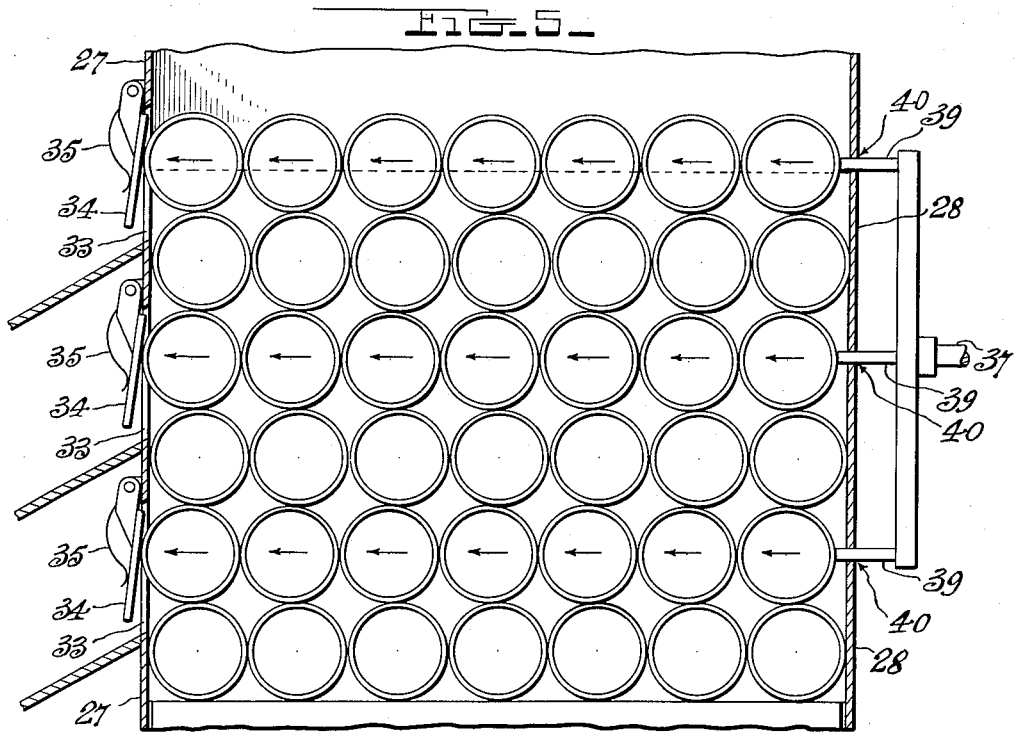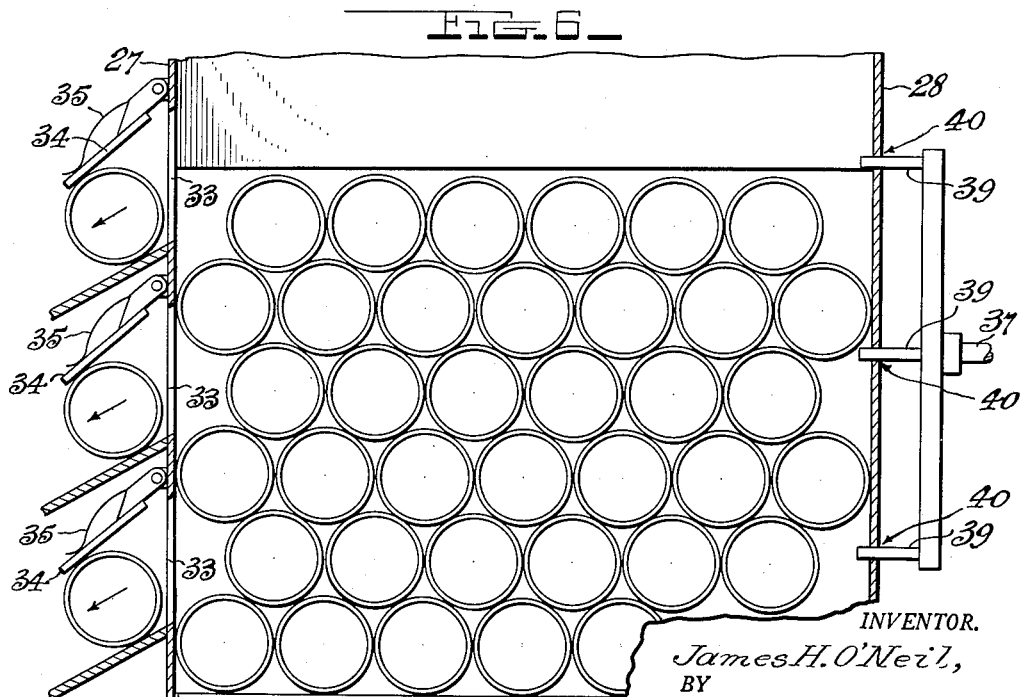

Sept. 20, 1955  J. H. O'NEIL  2,718,313
CAN ARRANGING METHOD AND APPARATUS
Filed Sept. 19, 1949  5 Sheets-Sheet 5
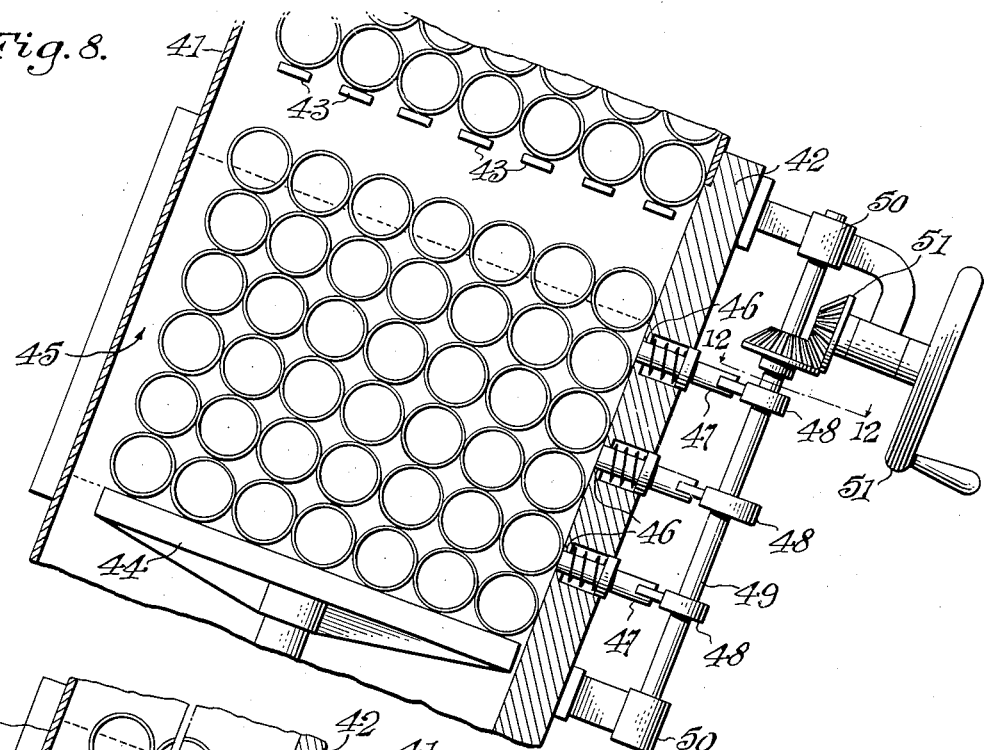
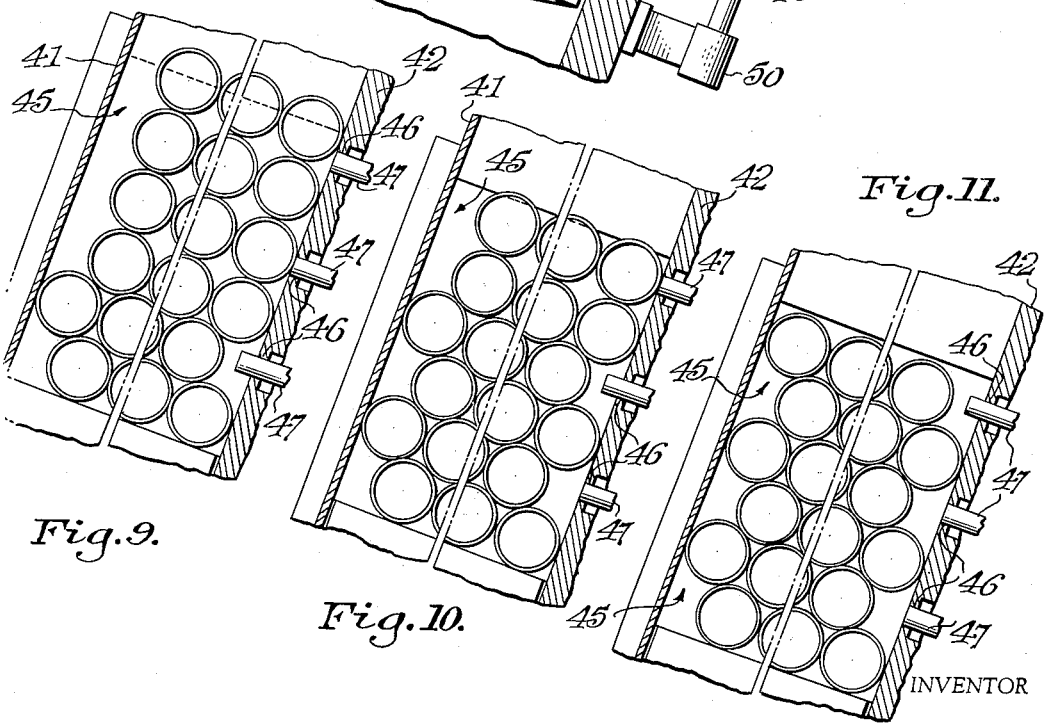
INVENTOR
James H. O'Neil
BY Mason, Porter, Diller & Stewart
ATTORNEYS

United States Patent Office 2,718,313
Patented Sept. 20, 1955

2,718,313
CAN ARRANGING METHOD AND APPARATUS

James H. O'Neil, Syracuse, N. Y., assignor to Continental Can Company, Inc., New York, N. Y., a corporation of New York Application September 19, 1949, Serial No. 116,477

15 Claims. (Cl. 214—6)

The invention relates generally to the art of manufacturing cans and primarily seeks to provide a novel method of and apparatus for arranging cans in staggered and nested row relation in order to facilitate handling, packaging and storing thereof.

It is common to package cans for distribution to the market in cartons or bags, and the cans usually are placed in these receptacles row beside row and tier upon tier. The smooth, light weight cylindriform cans are difficult to handle and it has been found that much sturdier and more compact packages can be formed if the cans in the respective tiers are arranged in closely contacting staggered and nested row relation. In the copending application for U. S. Letters Patent, Serial Number 620,359, filed by Walter M. Tomkins on October 4, 1945, and entitled Can Arranging and Bagging Method and Apparatus, issued on December 26, 1950, as United States Letters Patent 2,535,880, there are disclosed method and apparatus for arranging and bagging cans, including the arranging of the cans in the respective tiers in staggered and nested row relation, and it is a purpose of the present invention to provide a simplified method and apparatus for bringing about the desired staggered and nested row relation of the cans.

An object of the invention is to provide a novel method of arranging cans in staggered and nested row relation which consists in placing the cans in a confining chamber in at least two rows bearing longitudinal and transverse row relation with the axes of all cans in each said longitudinal row in a common longitudinal plane and with the axes of all cans in each said transverse row disposed in a common transverse plane, and then simultaneously shifting all cans in at least one such row in a like direction perpendicular to their axes and for a distance sufficient to bring about the desired staggered and nested relation of the can rows.

Another object of the invention is to provide a novel can row arranging method of the character stated which consists in placing the cans in a confining chamber in multiple longitudinal and transverse row relation with the axes of all cans in each said longitudinal row in a common longitudinal plane and with the axes of all cans in each transverse row disposed in a common transverse plane, and thereafter bringing about a shifting of all cans in each of alternated rows in a like general direction perpendicular to their axes and for a distance sufficient to bring about a staggered and nested relation of said multiple rows.

Another object of the invention is to provide a novel can row arranging method of the character stated in which all cans in the alternated rows are shifted simultaneously.

Another object of the invention is to provide a novel can row arranging method of the character stated in which the alternated rows of cans are shifted successively.

Another object of the invention is to provide a novel can row arranging method which consists in placing the cans in multiple upright and transverse row relation in a confining chamber uprightly disposed so as to place the axes of all cans in each said upright row in a common upright plane and in generally horizontal position, and the axes of all cans in each said transverse row in a common transverse plane and in generally horizontal position, and thereafter bringing about a shifting of all cans in each of alternated transverse rows in a like general direction perpendicular to their axes and for a limited distance sufficient to displace each can from the respective common upright plane and cause all cans so displaced to move by gravity action into staggered and nested row relation with the remaining rows.

Another object of the invention is to provide a novel can row arranging method of the character stated in which the chamber is tilted so that the upright and transverse can rows bear inclined relation to both vertical and horizontal and the alternated rows are shifted upwardly and laterally a limited distance sufficient to displace each can in each shifted row from the respective common upright plane and cause all cans so displaced to move by gravity action into staggered and nested row relation with the remaining rows.

Another object of the invention is to provide a novel can row arranging method of the character stated in which the shifting of the row or rows of cans effective to stagger and nest the rows is accomplished in a manner for dropping out or discharging one can from each row so shifted.

Another object of the invention is to provide a novel apparatus adapted for practicing the stated can arranging method and which includes a chamber in which to confine the cans in at least two rows bearing longitudinal and transverse row relation with the axes of all cans in each said longitudinal row in a common longitudinal plane and with the axes of all cans in each said transverse row disposed in a common transverse plane, means for bringing the cans into said chamber and arranging them in the relation stated, and means for simultaneously shifting all cans in at least one row in a like direction perpendicular to their axes and for a distance sufficient to bring about the desired staggered and nested row relation of the can rows.

Another object of the invention is to provide an apparatus of the character stated in which the can row shifting means operates to simultaneously shift alternated can rows in the chamber to bring about the desired staggered and nested row relation.

Another object of the invention is to provide an apparatus of the character stated in which the can row shifting means operates to successively shift alternated can rows in the chamber to bring about the desired staggered and nested row relation.

Another object of the invention is to provide an apparatus of the character stated in which the chamber is uprightly disposed and means are provided for bringing the cans into the chamber in upright and transverse row relation with the cans in each upright row in a common upright plane and in generally horizontal position, and with the cans in each transverse row in a common transverse plane in generally horizontal position, means being provided for shifting alternated can rows a limited amount to displace the individual cans therein from the respective common upright planes so that they will then move by gravity action into the desired staggered and nested row relation.

Another object of the invention is to provide an apparatus of the character stated wherein the chamber is disposed uprightly and tilted to one side so that the upright and transverse rows bear inclined relation to both vertical and horizontal, it thereby being necessary to shift the alternate rows upwardly and laterally in displacing the individual cans comprising the shifted rows from their respective common upright planes so that they can then move by gravity action into the desired staggered and nested row relation, the chamber being so proportioned as to leave a clear space at the side to which the can rows are shifted to permit said can row shifting.

Another object of the invention is to provide an apparatus of the character stated in which the can row confining chamber is equipped with an outlet or recess opposite each can row to be shifted in bringing the can rows into the desired staggered and nested relation and through or into which a single can of each shifted row can be discharged or displaced incidental to the arrangement of the rows in staggered and nested relation, and in which the movement of the shifted row or rows is brought about by a reciprocable pusher device.

With the above and other objects in view that will hereinafter appear, the nature of the invention will be more clearly understood by reference to the following detailed description, the appended claims, and the several views illustrated in the accompanying drawings.

In the drawings:

Figure 1 is a somewhat diagrammatic side elevation illustrating an apparatus adapted for the practicing of the invention.

Figure 2 is a vertical cross section taken on the line 2—2 on Figure 1.

Figure 3 is a fragmentary view similar to Figure 2 and illustrating the alternated can rows as simultaneously shifted into staggered and nested row relation in the confining and arranging chamber.

Figure 4 is a fragmentary view similar to Figure 2 illustrating a modified form of apparatus in which provision is made for discharging the endmost can in each row of shifted cans.

Figures 5 and 6 are fragmentary views similar to Figure 4 and showing successive stages in the simultaneous shifting of alternated can rows to bring about the desired staggered and nested can row relation in the confining and arranging chamber.

Figure 7 is a fragmentary left side elevation illustrating one of the can discharging doors.

Figure 8 is a fragmentary view similar to Figure 2 illustrating another modified form of apparatus in which provision is made for shifting the alternated can rows successively, provision also being made for receiving the endmost can in each row of shifted cans in a clear space at the side of the chamber toward which the can rows are shifted.

Figures 9, 10 and 11 are fragmentary views similar to Figure 8 and showing the successive shifting of these alternated rows of cans to bring about the desired staggered and nested row relation of the cans in the chamber.

Figure 12 is a fragmentary horizontal section taken on the line 12—12 on Figure 8.

In the drawings apparatus of the general nature of that disclosed in the previously mentioned copending Tomkins application is diagrammatically illustrated, but it is to be understood that other forms of apparatus may be employed in practicing the improved method of arranging the can rows in staggered and nested relation.

In the example of embodiment of the invention herein disclosed in Figures 1 to 3, there are included a can row receiving and confining chamber A, an upright conveyor chute B through which can rows are delivered to said chamber under control of the stop devices generally designated C and the lowerator generally designated D. It is to be understood that for the simple form of upright gravity chute B may be substituted other forms of conveyors, examples of which also are disclosed in the previously mentioned copending Tomkins application, now United States Letters Patent 2,535,880.

Within the can row receiving and confining chamber A the can rows are arranged in the desired staggered and nested relation by shifting or arranging devices generally designated E. After the can rows in each tier complement of cans are arranged in the desired staggered and nested row relation in the chamber A they are successively transferred by the pusher F from the chamber A into the form G wherein the bag complement of can tiers is assembled, and from which said bag complement of cans may be pushed into a bag on the tiltably mounted receiver H, all as described in the previously mentioned copending Tomkins application.

In more specific detail, the arranging means may include the chamber A preferably uprightly disposed and tilted to one side and defined by side walls 5 and 6, and at the bottom by the lowerator D which is in the form of a cross head 7 mounted on a vertically reciprocable plunger 8. It is to be understood that the cross head 7 is reciprocable between the lower full line position illustrated in Figure 2 and an upper limit position in which it will closely approximate the lowermost set of the stop devices C.

The chute B may be composed of upright parallel front and rear walls 9 and side walls 10 which converge as at 11 to join the side walls 5 and 6 of the receiving and confining chamber A. The chute B also includes very thin division or guide walls 12 for initially separating the upright rows of cans 13 preparatory to the lowering or feeding thereof into the receiving and confining chamber A.

The stop devices C may include an upper set of slidable stops 14 and a lower set of slidable stops 15, said stops being connected to the upper and lower ends of a rocker bar 16 which is pivoted intermediate its ends as at 17 in the manner illustrated in Figure 1. It is to be understood that the lower stops 15 initially engage beneath the uprightly arranged rows of cans 13 separated by the division walls 12 in the manner illustrated in Figure 2, and the upper stops 14 are placed in position to engage in transversely aligned cans spaced above the lower stops a distance for clearing a full tier complement of cans above the level of the lower stops. When it is desired to lower a tier complement of can rows into the receiving and confining chamber A, the cross head 7 is lifted to the dotted line position illustrated in Figure 2 whereupon the rocker bar 16 will be manipulated to retract the lower stops 15 and project the upper stops 14 into the interiors of the cans opposite them, or in other words, in position to receive them. The upper stops 14 will thus retain the rows of cans in the guides above the tier complement of can rows released by retraction of the lower stops 15 so that upon lowering of the cross head 7 to the full line position illustrated in Figure 2 said tier complement of can rows will be lowered into the receiving and confining chamber A as shown in said figure.

In the example illustration referred to the parts are so proportioned and arranged that a tier complement of cans will be composed of 42 cans made up of 6 transversely arranged rows and 7 uprightly or longitudinally arranged rows. In this disclosure wherein the receiving chamber and chute are uprightly disposed the axes of the cans in each so-called longitudinally or uprightly arranged row lie in the same vertical plane, and those in each so-called transversely arranged row also lie in the same transverse plane as the tier complement of cans is initially received in the chamber A in the manner illustrated in Figure 2. It is to be understood, of course, that the number of cans and rows to be included in each tier complement of cans may be varied at will.

It is to be noted that the uprightly disposed receiving chamber and chute are tilted to the right as viewed in Figures 2 and 3. Thus the uprightly and transversely aligned rows of cans received in the chamber are inclined with relation to both vertical and horizontal, the axes of all cans in any given transverse row lying in a common transverse plane, and the axes of all cans in any given upright row lying in a common upright plane. This upright disposition and inclination causes the cans to tend to gravitate downwardly toward the lowerator cross head 7 and laterally toward the side wall 5, and it will be observed that the chamber defining walls 5 and 6 are so spaced as to leave a clear space 18 uprightly along the wall 6 into which cans can be shifted in effecting the desired staggered and nested row arrangement.

The row shifter generally designated E comprises a cross head 19 carried by a reciprocable plunger 20 which is guided as at 21. The cross head 19 is equipped with three pusher fingers 22 which are disposed opposite the alternated can rows which are to be shifted in the manner clearly illustrated in Figures 2 and 3 of the drawings, and said fingers are reciprocable through apertures 23 provided in the chamber wall 5.

After a tier complement of cans has been lowered into the receiving and confining chamber in the manner previously described and as illustrated in the lower portion of Figure 2 the plunger 20 is pushed inwardly or to the left as illustrated in Figure 2 so as to shift the engaged alternate rows of cans to the left a limited distance, that is enough to move the center of each shifted can a slight distance beyond an imaginary vertical plane passing down through the axis of the underlying can. Thereafter, gravity will act to complete the shifting of the can rows into the positions illustrated in Figure 3, the endmost can in each of the alternate shifted rows coming to rest in the space 18 provided to permit this shifting at the left hand side of the chamber. It will be noted that the width of the space 18 is half the diameter of one of the cans. This shifting of the alternate can rows brings the can rows in the tier complement of cans into the desired staggered and nested row relation, and after the cans have been so arranged in the receiving and confining chamber A the pusher may be manipulated to push the tier complement of cans into the receiving form G in the manner described in the previously referred to copending Tomkins application for U. S. Letters Patent.

While it is preferred that the chute and chamber arrangement be tilted in the manner illustrated in Figures 2 and 3, it is not absolutely necessary that this tilting be resorted to. In the form of the invention illustrated in Figures 4 through 7 the chute and chamber structure is vertically disposed, and provision also is made for discharging the endmost can in each of the alternated shifted transverse can rows. Thus, whereas 42 cans comprised a tier complement in the previously described arrangement, by dropping out or discharging the endmost can in each alternated shifted can row, three cans will be eliminated from the originally assembled complement and the tier complement ultimately to be loaded will comprise 39 cans as shown in Figure 6.

In this form of the invention the chute includes the side walls 24, front and rear walls 25 and intermediate guides 26 as in the previously described form, and in passing down into the restricted receiving and confining chamber defined in part by the side walls 27 and 28 the cans pass through the converging throat defined by the converging walls 29. As in the previously described form the lowering of the cans in successive tier complements is controlled by the alternated action of the lower stops 30 and the upper stops 31 and by the vertically reciprocable lowerator cross head 32.

The chamber side wall 27 is provided with three outlets or openings 33, said openings being disposed opposite alternated transverse rows, or more specifically opposite the second, fourth and sixth transverse rows starting from the bottom as viewed in Figure 4. Each outlet opening 33 is normally closed by a pivotally mounted door 34 which is yieldably held in the closed position illustrated in Figure 4 by a light spring 35, said springs having sufficient strength to normally retain the longitudinally and transversely aligned row relation in the confining chamber as illustrated in said Figure 4.

As in the previously described form, the row shifter comprises a cross head 36 carried by a reciprocable plunger 37 which is guided as at 38. The cross head 36 is equipped with three pusher fingers 39 which are disposed opposite the can rows which are to be shifted, and said fingers are reciprocable through apertures 40 provided in the chamber wall 28.

After a tier complement of cans have been lowered into the receiving and confining chamber by retraction of the lower stops 30 with the lowerator 32 in the dotted line position illustrated in Figure 4, and the lowering of said lowerator to the full line position illustrated in said figure, the plunger 37 is pushed inwardly or to the left so as to shift the engaged alternate rows of cans to the left as indicated by the arrows in Figure 5. This shifting of the alternated can rows will cause the endmost can in each shifted row to displace the respective yieldably mounted closure door 34 in the manner clearly illustrated in Figures 5 and 6, and each said endmost can will fall out or be displaced through the respective opening 33 as indicated by the arrows in Figure 6. This will result in bringing the can rows in the tier complement of cans into the desired staggered and nested row relation, and the endmost cans discharged in the manner illustrated in Figure 6 may be collected and retained after they pass out through the openings 33, or, if desired, suitable means (not shown) may be provided for conveying them back into the supply of cans being fed into the upright chute.

It will be apparent that in both forms of the invention hereinbefore described the alternated rows of cans are simultaneously shifted in order to bring about the desired staggered and nested row relation of the cans. As they are shifted, all cans in a given shifted row travel in a like general direction perpendicular to their axes. They do not move in a straight line because as the can rows are assuming a staggered and nested relation the centers of the rows move closer together, as will be apparent by a comparison of Figures 2 and 3, 4 and 6, and so the movement of each can in a shifted row is laterally and downwardly, and the cans in the intermediate, non-shifted rows move downwardly only. This is true whether the can rows be brought into the desired staggered and nested row relation without discharging of individual cans, as in Figures 2 and 3, or with the discharging of the individual endmost cans in the alternated shifted rows as in Figures 4, 5 and 6. While the shifting of the can rows is effected simultaneously in the forms illustrated in Figures 2, 3 and 4–6 it is to be understood that the shifting of the rows may be accomplished successively in said example forms, by the use of shifting devices to be described hereinafter.

In Figures 8 through 12 there is illustrated another modified form of the invention in which the can rows are brought into the desired staggered and nested row relation without the discharging of any cans, and by a shifting of the alternated rows of cans successively, rather than simultaneously as previously described.

In these illustrations the can confining and arranging chamber preferably is tilted as in Figures 2 and 3 and as indicated in Figures 8 to 11 and is defined between side walls 41 and 42, the same arrangement of lower stops 43 and vertically reciprocable lowerator 44 being employed as in the previously described forms. As in the form of the invention shown in Figures 2 and 3 the wall 41 is positioned to provide a clear space 45 in which to receive the endmost cans in the alternate shifted rows.

The wall 42 is equipped with three apertures 46 which are vertically spaced in the manner clearly illustrated in Figure 8 through 11. It will be apparent that the lowermost aperture lies directly opposite the centers of the cans in the second row from the bottom of the assembled tier complement, the next highest aperture 46 lies directly opposite the position the centers of the cans in the fourth row from the bottom will occupy after the before mentioned second row of cans has been shifted in the manner illustrated in Figure 9, and the uppermost aperture 46 lies in the plane which will be occupied by the centers of the cans in the uppermost transverse row after said second and fourth can rows have been shifted in the manner illustrated in Figure 10. A spring retracted plunger 47 is reciprocable through each aperture 46, and each said plunger is engaged by a cam 48 on a rotary shaft 49 which is rotatable in bearings 50 and subject to being driven by means generally designated 51. The cams are staggered about the center of the shaft 49 in the manner clearly illustrated in Figure 12 so that by imparting rotation to said shaft they may be employed to successively shift the plungers 47 to successively shift the before mentioned second, fourth and sixth can rows in the manner respectively illustrated in Figures 9, 10 and 11.

It should be apparent that if each can row is shifted in the manner described, the endmost can in each row will move into the receiving space 45. As previously described the can rows move together or become nested as the alternated rows are shifted successively in the manner stated, and in the stages illustrated in Figures 9, 10 and 11.

It is to be understood that when the can rows are brought into the desired staggered and nested row relation without discharging cans in the manner described in connection with Figures 8 through 11, a pusher comparable to the pusher F of Figure 1 functions in like manner to push the assembled tier complement of cans from the chamber into the receiving form.

It is to be understood that the steps of the method and various components parts of the apparatus herein disclosed as examples of means for practicing the method can be variously modified without departing from the spirit and scope of the invention as defined in the appended claims.

I claim:

1. The herein described method of arranging cans in tier complements in staggered and nested row relation which consists in placing cans in a confining chamber in at least three rows bearing longitudinal and transverse row relation with the axes of all cans in each said longitudinal row disposed in a common longitudinal plane and the axes of all cans in each said transverse row disposed in a common transverse plane, and then positively and simultaneously shifting all cans in at least one such row disposed intermediately of two other such rows in one direction only namely in a like general direction perpendicular to their axes and for a distance sufficient to bring about a staggered and nested relation of said can rows.

2. The herein described method of arranging cans in tier complements in staggered and nested row relation which consists in placing the cans in multiple upright and transverse row relation in a chamber uprightly disposed and confining the cans against movement in the direction of their axes so as to place the axes of all cans in each said upright row in a common upright plane and in generally horizontal position and the axes of all cans in each said transverse row in a common transverse plane and in generally horizontal position, and thereafter positively and simultaneously shifting all cans in each of alternated transverse rows in a like general direction perpendicular to their axes within the confining chamber and for a limited distance sufficient to displace each can in each said shifted row and cause all cans so displaced to move by gravity action in said common upright plane into staggered and nested row relation with the remaining rows.

3. The herein described method of arranging cans in tier complements in staggered and nested row relation which consists in placing the cans in multiple upright and transverse row relation in a confining chamber uprightly disposed so as to place the axes of all cans in each said upright row in a common upright plane and in generally horizontal position and the axes of all cans in each said transverse row in a common transverse plane and in generally horizontal position, said chamber also being tilted to one side so that said upright and transverse planes bear perpendicular relation one to the other and are inclined with relation to both vertical and horizontal, and thereafter positively and simultaneously shifting all cans in each of alternated transverse rows upwardly and laterally for a limited distance sufficient to displace each can in each said shifted row and cause all cans so displaced to move by gravity action in said common upright plane into staggered and nested row relation with the remaining rows.

4. The herein described method of arranging cans in tier complements in staggered and nested row relation which consists in placing the cans in multiple upright and transverse row relation in a confining chamber uprightly disposed so as to place the axes of all cans in each said upright row in a common upright plane and in generally horizontal position and the axes of all cans in each said transverse row in a common transverse plane and in generally horizontal position, and thereafter successively shifting alternate transverse can rows to move all cans in each said shifted can row in a like general direction perpendicular to their axes and for a limited distance sufficient to displace each can so shifted from the respective common upright plane and cause all cans so displaced to move by gravity action into staggered and nested row relation with the remaining rows.

5. The herein described method of arranging cans in tier complements in staggered and nested row relation which consists in placing the cans in multiple upright and transverse row relation in a confining chamber uprightly disposed so as to place the axes of all cans in each said upright row in a common upright plane and in generally horizontal position and the axes of all cans in each said transverse row in a common transverse plane and in generally horizontal position, said chamber also being tilted to one side so that said upright and transverse planes bear perpendicular relation one to the other and are inclined with relation to both vertical and horizontal, and then successively shifting alternate transverse can rows to move all cans in each said shifted can row upwardly and laterally for a limited distance sufficient to displace each can so shifted from the respective common upright plane and cause all cans so displaced to move by gravity action into staggered and nested row relation with the remaining rows.

6. Apparatus for arranging cans in tier complements in staggered and nested row relation comprising a chamber in which to receive cans in at least two rows bearing longitudinal and transverse row relation with the axes of all cans in each longitudinal row disposed in a common longitudinal plane and the axes of all cans in each said transverse row disposed in a common transverse plane and to confine said cans against movement in the direction of their axes, means for bringing cans into said chamber and arranging them therein with said axes in said common plane relation, and means for simultaneously and positively shifting all cans in at least one row in a like general direction perpendicular to their axes in said common plane relation and for a distance sufficient to bring about the desired staggered and nested row relation of the can rows in said chamber.

7. Apparatus for arranging cans in tier complements in staggered and nested row relation comprising a chamber in which to receive cans in multiple rows bearing longitudinal and transverse row relation with the axes of all cans in each longitudinal row disposed in a common longitudinal plane and the axes of all cans in each said transverse row disposed in a common transverse plane and to confine said cans against movement in the direction of their axes, means for bringing cans into said chamber and arranging them therein with said axes in said common plane relation, and means for positively shifting all cans disposed in each of alternated transverse rows in a like general direction perpendicular to their axes in said common plane relation and for a distance sufficient to bring about the desired staggered and nested row relation of the can rows in said chamber.

8. Apparatus as defined in claim 7 in which the chamber is uprightly disposed to place the cans in upright and transverse row relation with the cans in each upright row in a common upright plane and in generally horizontal position and the axes of all cans in each said transverse row in a common transverse plane and with their axes in generally horizontal position, and said alternate row shifting means being operable to shift the individual cans of the rows only a limited distance to displace them from their respective upright common planes and cause them to move by gravity action the remainder of the distance necessary to place them in the desired staggered and nested row relation.

9. Apparatus for arranging cans in tier complements in staggered and nested row relation comprising a chamber in which to receive cans in multiple rows bearing longitudinal and transverse row relation with the axes of all cans in each longitudinal row disposed in a common longitudinal plane and the axes of all cans in each said transverse row disposed in a common transverse plane and to confine said cans against movement in the direction of their axes, means for bringing cans into said chamber and arranging them therein with said axes in said common plane relation, and means for successively shifting alternated can rows with all cans in each shifted row moving in like general direction perpendicular to their axes in said common plane relation and for a distance sufficient to bring about the desired staggered and nested row relation of the can rows in the chamber.

10. Apparatus as defined in claim 7 in which the chamber is uprightly disposed and tilted to one side to place the cans in upright and transverse row relation with the axes of all cans in each said upright row in a common upright plane and the axes of all cans in each said transverse row in a common transverse plane with said upright and transverse planes inclined to both horizontal and vertical and with the can axes in generally horizontal position, and said alternate row shifting means being operable to shift the individual cans of the alternate rows upwardly and laterally only a limited distance to displace them from their respective upright common planes and cause them to move by gravity action the remainder of the distance necessary to place them in a desired staggered and nested row relation, and said chamber being so proportioned as to provide a clear space at that side thereof toward which the can rows are shifted and in which to receive shifted cans.

11. Apparatus for arranging cans in tier complements in staggered and nested row relation comprising a chamber in which to receive and confine cans in multiple rows bearing longitudinal and transverse row relation with the axes of all cans in each longitudinal row disposed in a common longitudinal plane and the axes of all cans in each said transverse row disposed in a common transverse plane, means for bringing cans into said chamber and arranging them therein with said axes in common plane relation, and means for shifting all cans disposed in each alternate transverse row in a like general direction perpendicular to their axes and for a distance sufficient to bring about the desired staggered and nested row relation of the can rows in said chamber, said chamber being defined in part by a wall having openings therethrough through which the endmost can in each shifted alternate row may discharge as the rows are shifted to bring about the staggered and nested relation of the rows.

12. Apparatus for arranging cans in tier complements in staggered and nested row relation comprising a chamber in which to receive and confine cans in multiple rows bearing longitudinal and transverse row relation with the axes of all cans in each longitudinal row disposed in a common longitudinal plane and the axes of all cans in each said transverse row disposed in a common transverse plane, means for bringing cans into said chamber and arranging them therein with said axes in common plane relation, and means for shifting all cans disposed in each alternate transverse row in a like direction perpendicular to their axes to bring about the desired staggered and nested row relation of the can rows in said chamber, said chamber being defined in part by a wall having openings therethrough through which the endmost can in each shifted alternate row may discharge as the rows are shifted to bring about the staggered and nested relation of the rows, and yieldable doors normally closing said openings and hingedly mounted with their hinges paralleling the axes of the cans so as to be displaceable by side wall contact of shifted cans discharging through said openings.

13. Apparatus as defined in claim 7 in which the chamber is uprightly disposed and tilted to one side to place the cans in upright and transverse row relation with the axes of all cans in each said upright row in a common upright plane and the axes of all cans in each said transverse row in a common transverse plane with said upright and transverse planes inclined to both horizontal and vertical and with the can axes in generally horizontal position, and said alternate row shifting means being operable to shift all said alternated transverse rows simultaneously with the individual cans of the alternate rows moving upwardly and laterally only a limited distance to displace them from their respective upright common planes and cause them to move by gravity action the remainder of the distance necessary to place them in a desired staggered and nested row relation, and said chamber being so proportioned as to provide a clear space at that side thereof toward which the can rows are shifted and in which to receive shifted cans.

14. Apparatus as defined in claim 7 in which the chamber is uprightly disposed and tilted to one side to place the cans in upright and transverse row relation with the axes of all cans in each said upright row in a common upright plane and the axes of all cans in each said transverse row in a common transverse plane with said upright and transverse planes inclined to both horizontal and vertical and with the can axes in generally horizontal position, and said alternate row shifting means being operable to shift said alternated transverse rows successively with the individual cans of the alternate rows moving upwardly and laterally only a limited distance to displace them from their respective upright common planes and cause them to move by gravity action the remainder of the distance necessary to place them in a desired staggered and nested row relation, and said chamber being so proportioned as to provide a clear space at that side thereof toward which the can rows are shifted and in which to receive shifted cans.

15. The herein described method of arranging cans in tier complements in staggered and nested row relation which consists in placing cans in a confining chamber in multiple longitudinal and transverse row relation with all cans in tangential contact with each other and with the axes of all cans in each said longitudinal row disposed in a common longitudinal plane, and the axes of all cans in each said transverse row disposed in a common transverse plane, and thereafter bringing about a shifting of all cans in each of alternated transverse rows in a like general direction perpendicular to their axes for a distance equal to half the diameter of each can and a shifting of all cans in each row above the bottom row in a direction at right angles to the first said direction for a distance of less than half the diameter of a can to bring about a staggered and nested relation of said multiple rows in said confining chamber.

References Cited in the file of this patent

UNITED STATES PATENTS

| | | |
|---|---|---|
| 964,429 | Johnston | July 12, 1910 |
| 1,507,864 | Smith | Sept. 9, 1924 |
| 2,318,444 | Wilson | May 4, 1943 |
| 2,345,560 | Albertoli | Apr. 4, 1944 |
| 2,386,545 | Drobish | Oct. 9, 1945 |
| 2,424,303 | Carlson | July 22, 1947 |
| 2,535,880 | Tomkins | Dec. 26, 1950 |